United States Patent Office 3,798,268
Patented Mar. 19, 1974

3,798,268
1-BENZYL-3-[2-PHENOXY-5-(N-ETHYL-N-PHENYL-SULFAMOYL)PHENYL] - 2 - THIOUREAS AND CONGENERS
Robert C. Tweit, Wilmette, Ill., assignor to G. D. Searle & Co., Chicago, Ill.
No Drawing. Filed Dec. 30, 1968, Ser. No. 788,024
Int. Cl. C07c *157/06*
U.S. Cl. 260—552 R                          14 Claims

ABSTRACT OF THE DISCLOSURE

Preparation of 1 - benzyl-3-[2-phenoxy-5-(N-ethyl-N-phenylsulfamoyl)phenyl]-2-thioureas and congeners such as 1 - (2,5 - dimethylbenzyl)-3-[2-phenoxy-5-(N-ethyl-N-phenylsulfamoyl)phenyl]-2-thiourea, and valuable biological properties thereof including anti-ulcerogenic activity, are disclosed.

This invention relates to 1-benzyl-3-[2-phenoxy-5-(N-ethyl - N-phenylsulfamoyl)phenyl]-2-thioureas and congeners, and to processes for the preparation thereof. More particularly, this invention provides new, useful, and unobvious chemical compounds of the formula

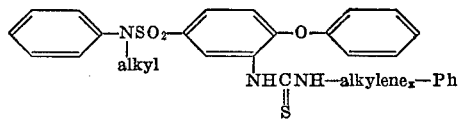

wherein $x$ represents 0 or 1 and Ph represents phenyl optionally substituted by one or more of the following: alkyl, trifluoromethyl, halogen, alkoxy, nitro, and sulfamoyl.

Among the alkyls called for above, lower alkyls are preferred, which is to say methyl, ethyl, propyl, butyl, isobutyl, sec.-butyl, tert.-butyl, pentyl, neopentyl, hexyl, isohexyl, heptyl, and like monovalent, saturated, acyclic, straight- or branched-chain, hydrocarbon radicals of empirical formula

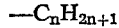

wherein $n$ represents a positive integer less than 8. The alkylenes and alkoxys called for are likewise preferably of lower order, and thus can be enformulated

and

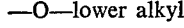

respectively, $n$ being defined as before. Typical lower alkylenes include methylene, ethylene, trimethylene, propylene, tetramethylene, 1,1-dimethylethylene, pentamethylene, 2,2-dimethyltrimethylene and like bivalent, saturated, acyclic, straight- or branched-chain, hydrocarbon groupings containing fewer than 8 carbons. The halogens referred to are, of course, fluorine, chlorine, bromine, and iodine. Although as many as 5 of the phenyl substituents comprehended by Ph, alike or different, can be present, fewer than 3 are preferable, disposed ad libitum about the benzene ring. Those skilled in the art will recognize that when $x$ in the introductory formula represents 0, no alkylene bridge is present.

Equivalent to the foregoing compounds for the purposes of this invention are solvates of said compounds in which biologically insignificant solvent—for example, an equimolar amount or less—is present.

The compounds to which this invention relates are useful by reason of their valuable pharmacological properties—especially, their anti-ulcerogenic activity.

The anti-ulcerogenic utility of the instant compounds is evident from the results of a standardized test for their capacity to inhibit the ulceration reported by Shay et al., Gastroenterology, 5, 43 (1945), to occur in rats subjected to fasting and pyloric ligation. In this test, male Charles River rats weighing 200–250 gm. and fasted 72 hr. prior to ligation are used. Immediately following ligation, the prescribed dose of compound, dissolved or suspended in 1.0 ml. of pH 2.0 hydrochloric acid, is intragastrically administered to each of a group of 6 animals. A like group of animals to which is identically and concurrently administered the acid alone serves as controls. Precisely 19 hrs. later, the stomachs of surviving animals are excised and examined under 5× magnification. The number of ulcers occurring in the non-secretory portion of each stomach is counted in 4 groups according to size (<2 mm., 2–4 mm., 4–8 mm., and >8 mm.); and each rat receives a score, $z$, which is a weighted average of the logarithms of the ulcer counts in the several size groups determined by a formula found approximately optimal by discriminant function analysis to be $$z = 20.00 \log (N_1+1) + 0.22 \log (N_2+1) + 46.76 \log (N_3+1) + 6.11 \log (N_4+1)$$

where $N_1 \ldots N_4$ are the observed ulcer counts of the increasing size groups. Since long-term studies in approximately 400 animals show that the average $z$ value for controls is 96.2, with a standard error per group of 6 equal to 18.97, a decrease in the average $z$ score for a given test group, relative to concurrent controls, amounting to 37.5 or more is significant ($P \leq 0.05$); and a compound producing such a decrease is considered anti-ulcerogenic. Typical of compounds producing such a decrease, when tested at the 50 mg. dose level, are the products of Examples 4, 6, 8 and 13 hereinafter.

Those skilled in the art will recognize that observations of activity in standardized tests for particular biological effects are fundamental to the development of valuable new drugs, both veterinary and human.

Preparation of the instant compounds proceeds by contacting in a solvent medium such as chloroform, dichloromethane, propanol, and/or ether, a benzenesulfonanilide of the formula

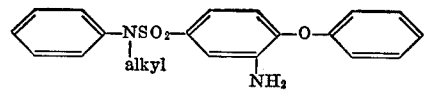

with an isothiocyanate of the formula

wherein $x$ and Ph are defined as before. The reaction can be catalyzed by a tertiary amine or moderate heating.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials are in parts by weight, except as otherwise noted.

EXAMPLE 1

3 - [2-phenoxy-5-(N-ethyl-N-phenylsulfamoyl)phenyl]-1-phenyl-2-thiourea.—A mixture of 46 parts of 3-amino-N-ethyl-4-phenoxybenzenesulfonanilide, 17 parts of phenyl isothiocyanate, and 375 parts of chloroform is heated at 85–95° overnight, solvent being driven off in process. The residue is taken up in benzene and chromatographed on silica gel, using benzene and ethyl acetate as developing solvents. From an eluate comprising 2% ethyl acetate in benzene, solvents are removed by vacuum distillation. The glassy residue is 3-[2-phenoxy-5-(N-ethyl N-phenylsulfamoyl)phenyl]-1-phenyl-2-thiourea, having the formula

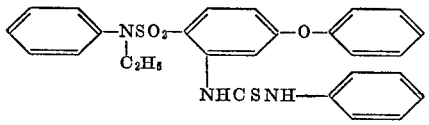

EXAMPLE 2

1-benzyl-3-[2-phenoxy - 5 - (N-ethyl-N-phenylsulfamoyl)phenyl]-2-thiourea.—A mixture of 92 parts of 3-amino-N-ethyl-4-phenoxybenzenesulfonanilide, 37 parts of benzyl isothiocyanate, and 375 parts of chloroform is heated at 85–95° overnight, solvent being driven off in process. When 175 parts of ether is added to the residue, a solid forms which, filtered off and dried in air, melts at 145–147°. This material is 1-benzyl-3-[2-phenoxy-5-(N-ethyl - N - phenylsulfamoyl)phenyl]-2-thiourea, having the formula

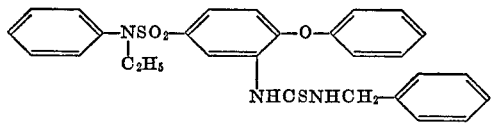

EXAMPLE 3

3-[2-phenoxy - 5 - (N-ethyl - N - phenylsulfamoyl)phenyl]-1-(p-methylbenzyl)-2-thiourea.—A mixture of 92 parts of 3-amino-N-ethyl-4-phenoxybenzenesulfonanilide, 41 parts of p-methylbenzyl isothiocyanate, and 375 parts of chloroform is heated at 85–95° overnight, solvent being driven off in process. When 175 parts of ether and 65 parts of hexane is added to the oily residue, a solid forms which, filtered off and dried in air, melts at 141–143°. The product is 3-[2-phenoxy-5-(N-ethyl-N-phenylsulfamoyl)phenyl] - 1 - (p-methylbenzyl)-2-thiourea, having the formula

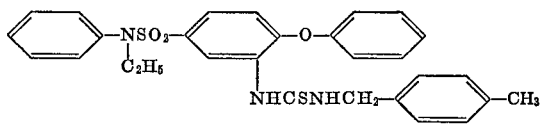

EXAMPLE 4

1-(2,5-dimethylbenzyl) - 3 - [2-phenoxy-5-(N-ethyl-N-phenylsulfamoyl)phenyl]-2-thiourea.—Substitution of 44 parts of 2,5-dimethylbenzyl isothiocyanate for the p-methylbenzyl isothiocyanate called for in Example 3 affords, by the procedure there detailed, 1-(2,5-dimethylbenzyl)-3-[2-phenoxy-5-(N-ethyl - N - phenylsulfamoyl)phenyl]-2-thiourea which, recrystallized from dichloromethane, melts at 167–168.5°.

EXAMPLE 5

(A) o-Trifluoromethylbenzyl isothiocyanate.—To a solution of 390 parts of potassium thiocyanate and 300 parts of sodium iodide in 3800 parts of dimethylformamide at the boiling point under reflux is added, during 5 minutes, a hot solution of 864 parts of o-trifluoromethylbenzyl bromide in 2850 parts of dimethylformamide. Boiling under reflux is continued for 10 minutes, whereupon the reaction mixture is poured into 10,000 parts of ice-water. The resultant mixture is extracted with chloroform. The chloroform extract is dried over anhydrous sodium sulfate and stripped of solvent by vacuum distillation. The residue is o-trifluoromethylbenzyl isothiocyanate.

(B) 3-[2-phenoxy - 5 - (N-ethyl-N-phenylsulfamoyl)phenyl]-1-(o-trifluoromethylbenzyl)-2-thiourea.—A mixture of 92 parts of 3-amino-N-ethyl-4-phenoxybenzenesulfonanilide, 55 parts of o-trifluoromethylbenzyl isothiocyanate, and 375 parts of chloroform is heated at 85–95° overnight, solvent being driven off in process. The residue is 3-[2-phenoxy-5-(N - ethyl - N - phenylsulfamoyl)phenyl]-1-(o-trifluoromethylbenzyl)-2-thiourea.

EXAMPLE 6

3 - [2 - phenoxy - 5 - (N - ethyl - N - phenylsulfamoyl)-phenyl]-1-(m-trifluoromethylbenzyl) - 2 - thiourea.—Substitution of 55 parts of m-trifluoromethylbenzyl isothiocyanate for the p-methylbenzyl isothiocyanate called for in Example 3 affords, by the procedure there detailed, 3 - [2 - phenoxy - 5 - (N - ethyl - N - phenylsulfamoyl)-phenyl]-1-(m-trifluoromethylbenzyl)-2-thiourea melting at 113–115°.

EXAMPLE 7

1 - (o - chlorobenzyl) - 3 - [2 - phenoxy - 5 - (N-ethyl-N-phenylsulfamoyl)phenyl] - 2 - thiourea.—Substitution of 46 parts of o-chlorobenzyl isothiocyanate for the p-methylbenzyl isothiocyanate called for in Example 3 affords, by the procedure there detailed, 1-(o-chlorobenzyl) - 3 - [2 - phenoxy - 5 - (N - ethyl - N - phenylsulfamoyl)phenyl]-2-thiourea melting at 141–144°.

EXAMPLE 8

1 - (m - chlorobenzyl) - 3 - [2 - phenoxy - 5 - (N-ethyl - N - phenylsulfamoyl)phenyl] - 2 - thiourea.—Substitution of 44 parts of m-chlorobenzyl isothiocyanate for the p-methylbenzyl isothiocyanate called for in Example 3 affords, by the procedure there detailed 1-(m-chlorobenzyl) - 3 - [2 - phenoxy - 5 - (N-ethyl-N-phenylsulfamoyl)phenyl]-2-thiourea melting at 132–134°.

EXAMPLE 9

1 - (p - chlorobenzyl) - 3 - [2 - phenoxy - 5 - (N-ethyl-N-phenylsulfamoyl)phenyl]-2-thiourea.—A solution of 184 parts of 3-amino-N-ethyl-4-phenoxybenzenesulfonanilide in 670 parts of dichloromethane is mixed with a solution of 92 parts of p-chlorobenzyl isothiocyanate in 350 parts of ether, whereupon 2 parts of triethylamine followed by 750 parts of chloroform is added. Solvents are then removed by vacuum distillation and the residue crystallized from a mixture of ether and hexane and finally from dichloromethane. The resultant product is 1 - (p - chlorobenzyl) - 3 - [2 - phenoxy - 5 - (N-ethyl-N-phenylsulfamoyl)phenyl]-2-thiourea melting at 148–151°.

EXAMPLE 10

1 - (3,4 - dichlorobenzyl) - 3 - [2 - phenoxy - 5 - (N-ethyl-N-phenylsulfamoyl)phenyl]-2-thiourea.—A mixture of 92 parts of 3-amino-N-ethyl-4-phenoxybenzenesulfonanilide, 54 parts of 3,4-dichlorobenzyl isothiocyanate, and 375 parts of chloroform is heated at around 90° for 5 hours, solvent being driven off in process. The residue is cooled and mixed with 65 parts of hexane. The solid which forms is filtered off and recrystallized from a mixture of dichloromethane, ether, and hexane, to give 1-(3,4 - dichlorobenzyl) - 3 - [2 - phenoxy-5-(N-ethyl-N-phenylsulfamoyl)phenyl]-2-thiourea melting at 150–153°.

EXAMPLE 11

1 - (p - fluorobenzyl) - 3 - [2 - phenoxy-5-(N-ethyl-N-phenylsulfamoyl)phenyl]-2-thiourea.—Substitution of 42 parts of p-fluorobenzyl isothiocyanate for the benzyl isothiocyanate called for in Example 2 affords, by the procedure there detailed, 1-(p-fluorobenzyl)-3-[2-phenoxy-5-(N-ethyl-N-phenylsulfamoyl)phenyl]-2-thiourea melting at 133–136°.

EXAMPLE 12

1 - (p - bromobenzyl) - 3 - [2 - phenoxy - 5 - (N-ethyl-N-phenylsulfamoyl)phenyl]-2-thiourea.—A mixture of 92 parts of 3-amino-N-ethyl-4-phenoxybenzenesulfonanilide, 57 parts of p-bromobenzyl isothiocyanate, and 375 parts of chloroform is heated at 85–95° overnight, solvent being driven off in process. The oily residue is cooled and mixed with 70 parts of ether and 65 parts of hexane. The solid which forms is filtered off and recrystallized from a mixture of dichloromethane and ether to 1 - (p - bromobenzyl) - 3 - [2 - phenoxy-5-(N-ethyl-N-phenylsulfamoyl)phenyl]-2-thiourea melting at 147–150°.

EXAMPLE 13

1 - (p - methoxybenzyl) - 3 - [2 - phenoxy - 5 - (N-ethyl-N-phenylsulfamoyl)phenyl] - 2 - thiourea.—Substitution of 45 parts of p-methoxybenzyl isothiocyanate for the p-methylbenzyl isothiocyanate called for in Example 3 affords, by the procedure there detailed, 1-(p-methoxybenzyl) - 3 - [2 - phenoxy-5-(N-ethyl-N-phenylsulfamoyl)phenyl]-2-thiourea which, recrystallized from dichloromethane, melts at 157–160°.

EXAMPLE 14

(A) 3,4-dimethoxybenzyl isothiocyanate.—Substitution of 655 parts of 3,4-dimethoxybenzyl chloride for the o-trifluoromethylbenzyl bromide called for in Example 5(A) affords, by the procedure there detailed, 3,4-dimethoxybenzyl isothiocyanate.

(B) 1 - (3,4 - dimethoxybenzyl)-3-[2-phenoxy-5-(N-ethyl-N-phenylsulfamoyl)phenyl] - 2 - thiourea.—Substitution of 53 parts of 3,4-dimethoxybenzyl isothiocyanate for the o-trifluoromethylbenzyl isothiocyanate called for in Example 5(B) affords, by the procedure there detailed, 1 - (3,4-dimethoxybenzyl)-3-[2-phenoxy-5-(N-ethyl-N-phenylsulfamoyl)phenyl]-2-thiourea.

EXAMPLE 15

1 - (m - nitrobenzyl) - 3 - [2 - phenoxy-5-(N-ethyl-N-phenylsulfamoyl)phenyl]-2-thiourea.—A mixture of 92 parts of 3-amino-N-ethyl-4-phenoxybenzenesulfonanilide, approximately 49 parts of m-nitrobenzyl isothiocyanate, and 375 parts of chloroform is heated at 85–95° overnight, solvent being driven off in process. The solid residue is recrystallized from dichloromethane to give 1-(m-nitrobenzyl) - 3 - [2-phenoxy-5-(N-ethyl-N-phenylsulfamoyl)-phenyl]-2-thiourea melting at 144–147°.

EXAMPLE 16

(A) 2,4-dinitrobenzyl isothiocyanate.—Substitution of 781 parts of 2,4-dinitrobenzyl chloride for the o-trifluorobenzyl bromide called for in Example 5(A) affords, by the procedure there detailed, 2,4-dinitrobenzyl isothiocyanate.

(B) 1 - (2,4 - dinitrobenzyl)-3-[2-phenoxy-5-(N-ethyl-N-phenylsulfamoyl)phenyl]-2-thiourea.—Substitution of 61 parts of 2,4-dinitrobenzyl isothiocyanate for the o-trifluoromethylbenzyl isothiocyanate called for in Example 5(B) affords, by the procedure there detailed, 1-(2,4-dinitrobenzyl) - 3 - [2 - phenoxy - 5-(N-ethyl-N-phenylsulfamoyl)phenyl]-2-thiourea.

EXAMPLE 17

(A) p-Sulfamoylbenzyl isothiocyanate.—To a solution of 440 parts of potassium thiocyanate and 360 parts of sodium iodide in 3800 parts of dimethylformamide at the boiling point under reflux is added during 3.5 minutes a hot solution of 1000 parts of p-bromomethyl benzenesulfonamide in 3040 parts of dimethylformamide. Boiling under reflux is continued for 7 minutes, whereupon the reaction mixture is poured into 20,000 parts of ice-water. The solid which forms is separated by filtration and recrystallized from dichloromethane to yield p-sulfamoylbenzyl isothiocyanate melting at 149–152°.

(B) 3 - [2 - phenoxy-5-(N-ethyl-N-phenylsulfamoyl)-phenyl]-1-(p-sulfamoylbenzyl)-2-thiourea.—A mixture of 46 parts of 3-amino-N-ethyl-4-phenoxybenzenesulfonanilide, 29 parts of p-sulfamoylbenzyl isothiocyanate, 1125 parts of chloroform, and 200 parts of 2-propanol is heated at 85–95° overnight, solvent being driven off in process. The residue crystallizes from a mixture of ether, acetone, and hexane. The crystalline product is isolated by filtration and recrystallized first from a mixture of chloroform and acetone and then from acetone alone to give 3-[2-phenoxy - 5 - (N-ethyl-N-phenylsulfamoyl)phenyl]-1-(p-sulfamoylbenzyl)-2-thiourea hemiacetonate melting at approximately 115–116°. Solvent of crystallization is removed by heating in vacuo at 80°.

What is claimed is:
1. A compound of the formula

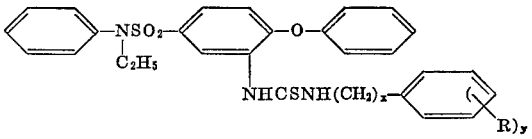

wherein $x$ represents 0 or 1, $y$ represents 1 or 2, and R represents hydrogen, methyl, trifluoromethyl, halogen, methoxy, nitro, or sulfamoyl.

2. A compound according to claim 1 having the formula

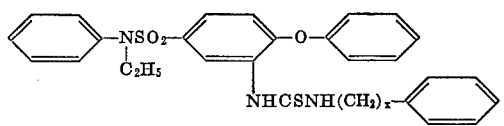

wherein $x$ represents 0 or 1.

3. A compound according to claim 1 having the formula

wherein $y$ represents 1 or 2.

4. A compound according to claim 1 which is 1-(2,5-dimethylbenzyl) - 3 - [2-phenoxy-5-(N-ethyl-N-phenylsulfamoyl)phenyl]-2-thiourea.

5. A compound according to claim 1 having the formula

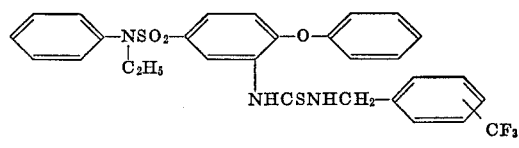

6. A compound according to claim 1 which is 3-[2-phenoxy - 5 - (N - ethyl - N - phenylsulfamoyl)phenyl]-1-(m-trifluoromethylbenzyl)-2-thiourea.

7. A compound according to claim 1 having the formula

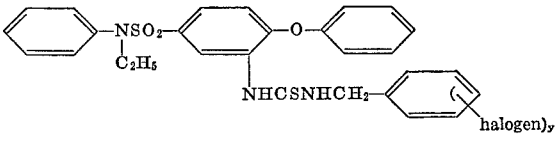

wherein $y$ represents 1 or 2.

8. A compound according to claim 1 having the formula

9. A compound according to claim 1 having the formula

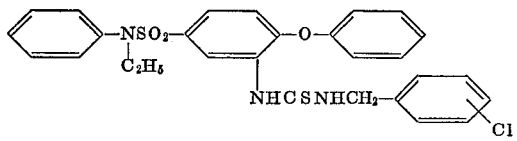

10. A compound according to claim 1 which is 1-(m-chlorobenzyl) - 3 - [2 - phenoxy - 5-(N-ethyl-N-phenyl-sulfamoyl)-phenyl]-2-thiourea.

11. A compound according to claim 1 having the formula

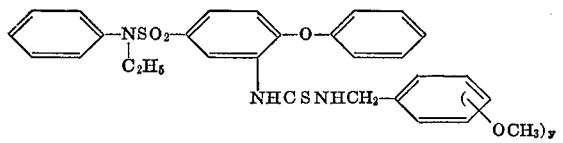

wherein $y$ represents 1 or 2.

12. A compound according to claim 1 which is 1-(p-methoxybenzyl) - 3 - [2 - phenoxy-5-(N-ethyl-N-phenyl-sulfamoyl)-phenyl]-2-thiourea.

13. A compound according to claim 1 having the formula

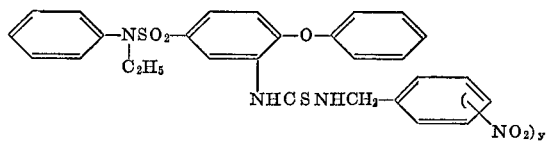

wherein $y$ represents 1 or 2.

14. A compound according to claim 1 which is 1-(m-nitrobenzyl) - 3 - [2 - phenoxy - 5-(N-ethyl-N-phenyl-sulfamoyl)-phenyl]-2-thiourea.

References Cited
UNITED STATES PATENTS

| | | | |
|---|---|---|---|
| 2,714,613 | 8/1955 | Huebner | 260—552 |
| 3,266,987 | 8/1966 | Crowley | 260—552 |

LEON ZITVER, Primary Examiner

M. W. GLYNN, Assistant Examiner

U.S. Cl. X.R.

424—322